Figure 1:
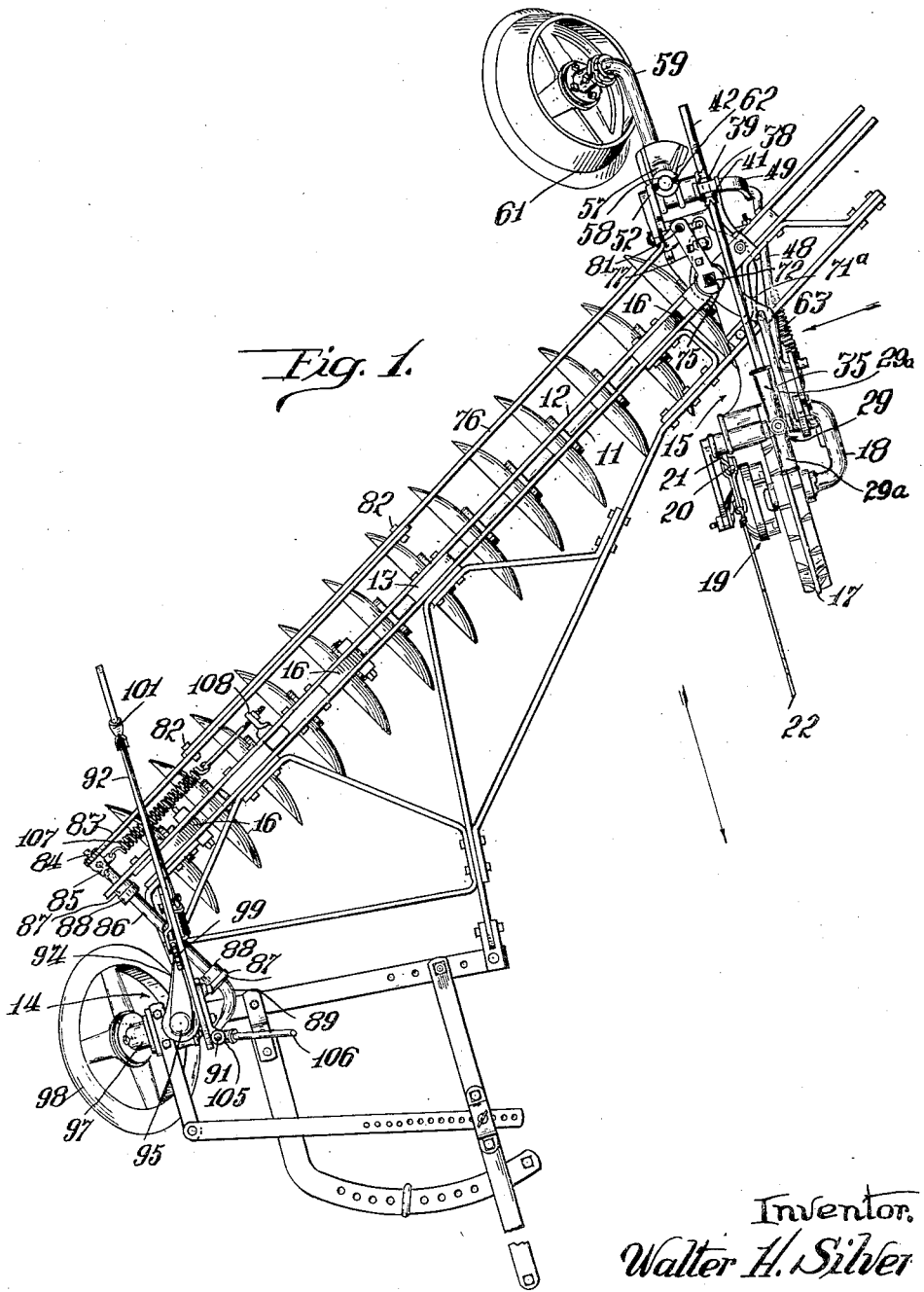

Nov. 1, 1932.  W. H. SILVER  1,885,955
AGRICULTURAL IMPLEMENT
Filed April 23, 1930   5 Sheets-Sheet 1

Inventor,
Walter H. Silver
By Brown, Jackson, Boettcher & Dienner
Attorneys

Witness
Milton Lenoir

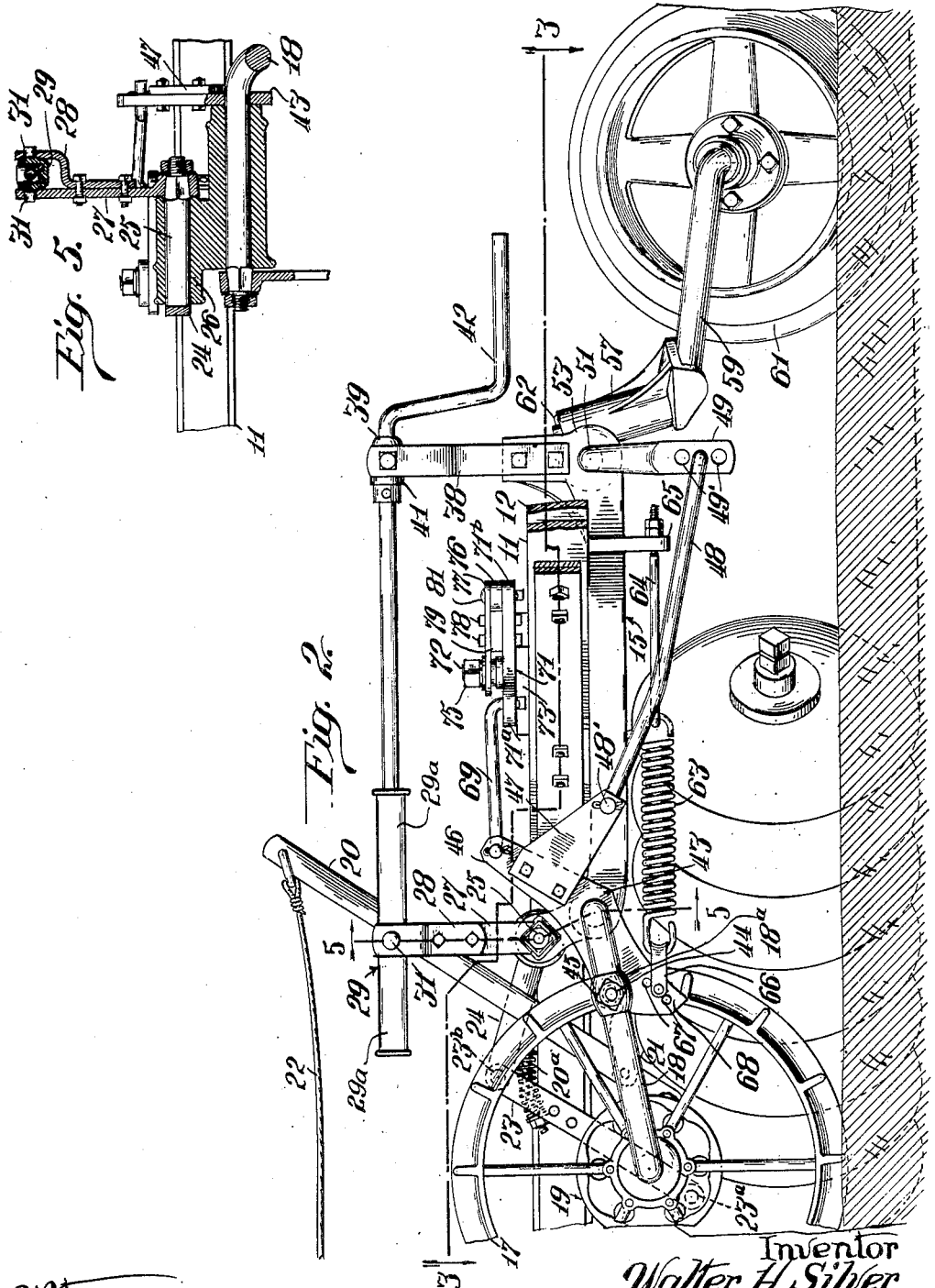

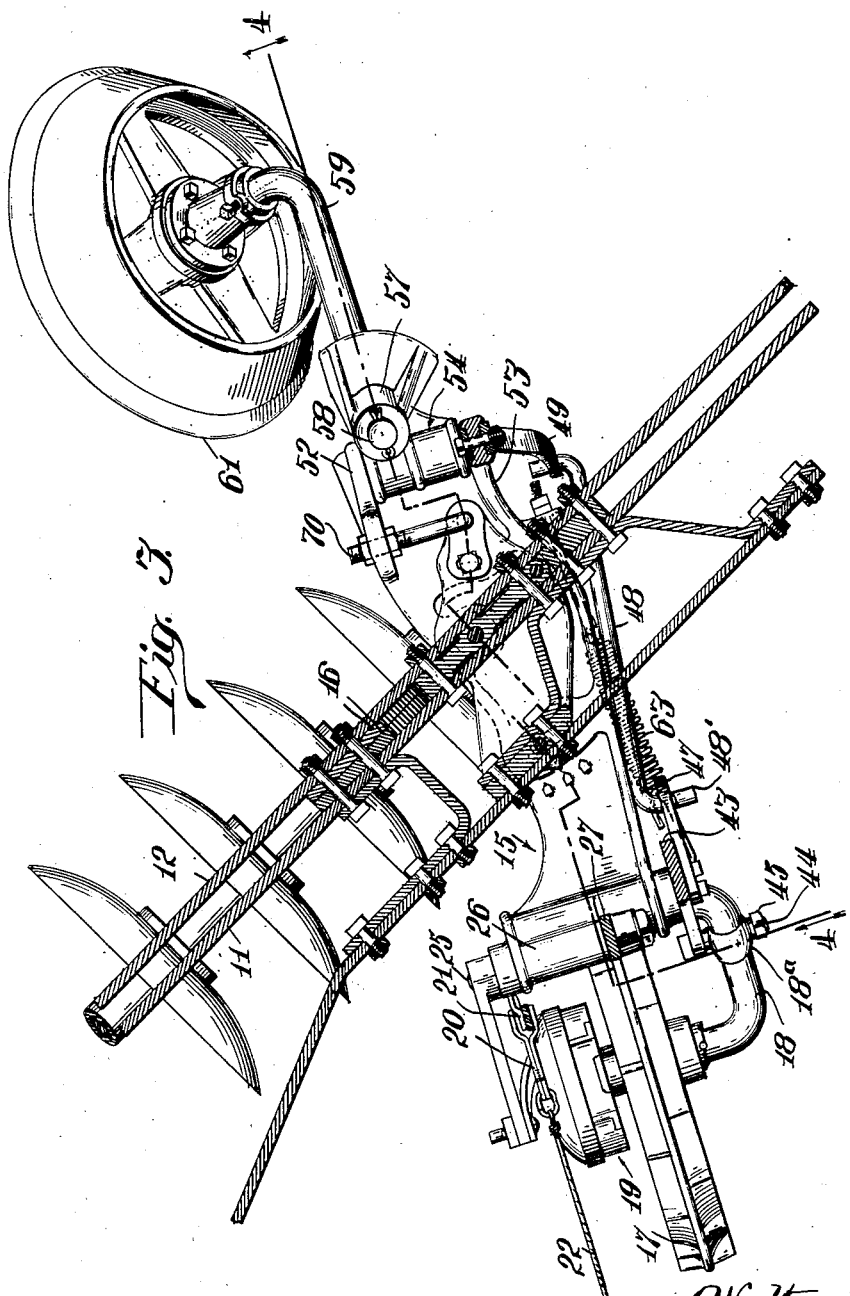

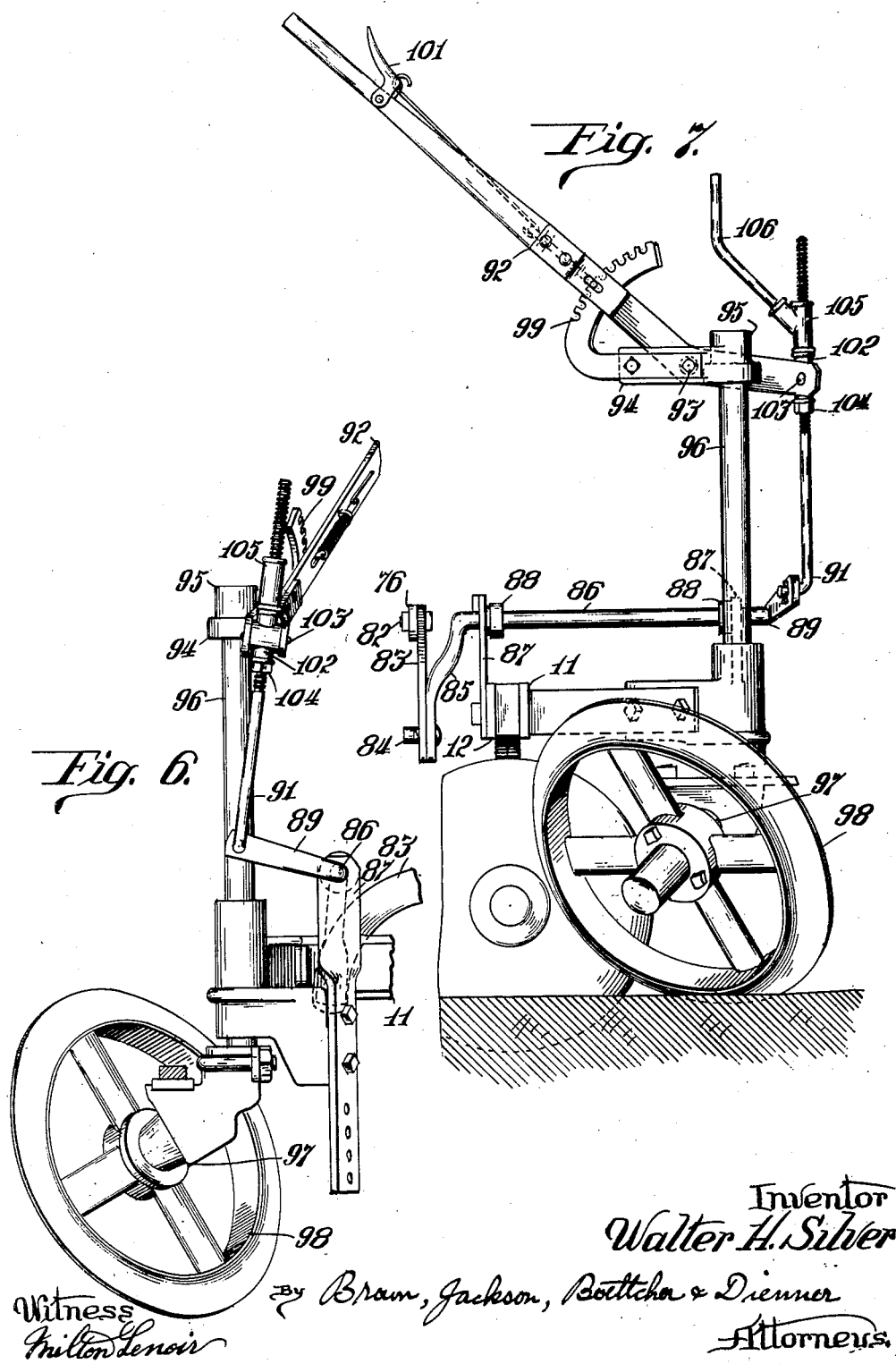

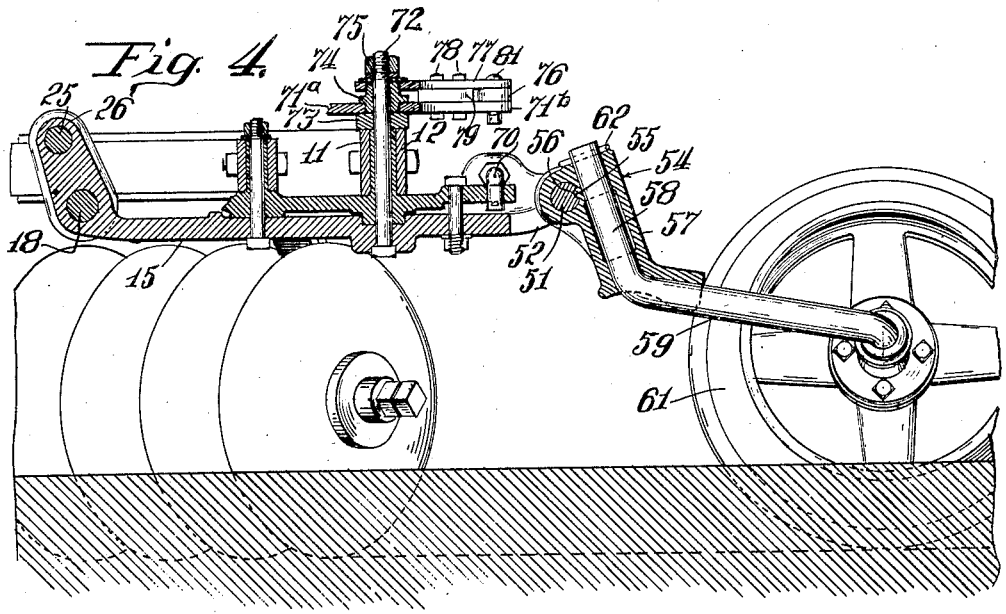
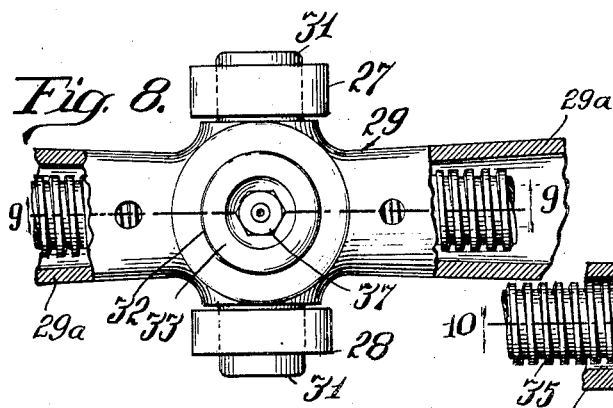
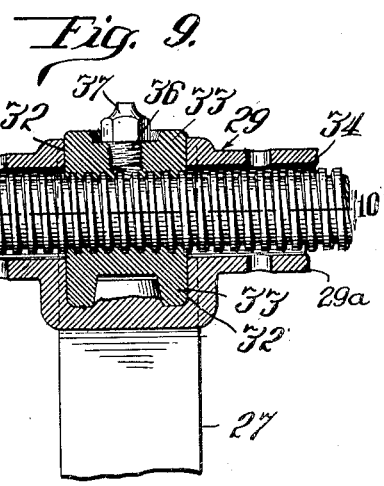
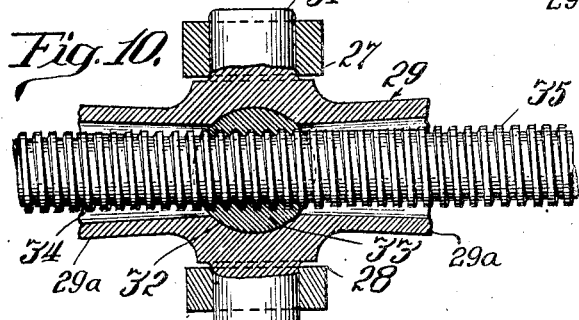

Patented Nov. 1, 1932

1,885,955

UNITED STATES PATENT OFFICE

WALTER H. SILVER, OF MOLINE, ILLINOIS, ASSIGNOR TO DEERE & COMPANY, OF MOLINE, ILLINOIS, A CORPORATION OF ILLINOIS

AGRICULTURAL IMPLEMENT

Application filed April 23, 1930. Serial No. 446,505.

The present invention relates to agricultural implements of the type characterized by a series of discs usually arranged in axial alinement, all facing in the same direction, and with the common axis of the discs extending at an angle to the line of draft of the implement. Such implements, commonly referred to as disk tillers, are extensively used as disc plows in certain soils, particularly where a comparatively shallow plowing depth suffices in preparing the seed bed. An implement of this general type is shown and described in my pending application, Serial No. 406,179, filed November 11, 1929.

In prior devices of this type it has been customary to provide separate hand operated lever or screw threaded adjusting means on the frame adjacent to each of the three wheels for adjusting the frame of the implement vertically relative to the wheels to raise or lower the discs to transport or operative position. This, of course, necessitated three separate adjustments, which was inconvenient.

The principal object of my present invention is the provision of new and improved power transmitting means for simultaneously raising and lowering the frame vertically relative to all of the supporting wheels. These disc tillers are much wider than ordinary disc plows, frequently operating with a span of from ten to fifteen or more discs. This positions the truck of the front furrow wheel at a considerable distance from the land wheel and at a point located outwardly at quite a lateral angle with respect to the line of travel of the land wheel. It is a further object of my invention, in this regard, to provide improved power lift means which will effectively transmit power lift energy from the land wheel to the front furrow wheel through this pronounced lateral angle between the locations of the land and front furrow wheels.

A further object of the invention is the provision of screw crank adjusting means mounted on the rear truck of the implement for regulating the depth of penetration of the discs, and for leveling the implement.

A still further object of the invention is the provision of an improved universal nut for use in connection with the screw crank adjusting means whereby any tendency of the threaded portion of the screw to bind in the nut is eliminated.

Still other objects and advantageous features will appear from the following description taken in connection with the accompanying drawings, in which—

Fig. 1 is a plan view of the implement;
Fig. 2 is a side elevation of the rear portion of the implement looking in the direction of the arrow 2 in Fig. 1;
Fig. 3 is a horizontal cross-sectional view taken substantially on the line 3—3 of Fig. 2;
Fig. 4 is a vertical cross-sectional view taken substantially on the line 4—4 of Fig. 3;
Fig. 5 is a vertical cross-sectional view taken substantially on the line 5—5 of Fig. 2;
Fig. 6 is a front view illustrating the front furrow wheel, its connection with the frame, and the means for adjusting the frame relative to the wheel;
Fig. 7 is a side view of the front furrow wheel and the adjusting means associated therewith;
Fig. 8 is a top plan view of the improved universal nut in position on the threaded portion of the depth adjusting crank screw;
Fig. 9 is a sectional view taken on the plane of the line 9—9 of Fig. 8; and
Fig. 10 is a sectional view taken on the plane of the line 10—10 of Fig. 9.

Referring to the drawings, the frame of the implement comprises two parallel members 11, 12 which extend diagonally fore and aft and are suitably spaced apart by spacing blocks 13, the forward ends of said members being suitably secured to a front truck 14 in any appropriate manner, while the rear ends of said members are pivotally connected with a rear truck 15 by a vertical pivot as hereinafter described. Standards 16 are suitably clamped between the members 11, 12 at spaced points therealong and carry the various sections of discs. The disc gang construction as well as the frame construction of this implement is substantially the same as that shown in my above mentioned pending application, and as they have nothing to do with my present invention it is unnecessary to describe them more in detail herein.

The forward end of the rear truck 15 is supported by a land wheel 17 loosely mounted to rotate on the lower horizontally turned portion of a crank axle 18, the upper horizontally turned end of which is suitably journaled in and extends through a horizontal bearing in said truck. On the end of said crank axle adjacent the furrowward side of the land wheel is mounted a standard half-revolution clutch 19 which, when thrown into operation, cooperates with said wheel to raise the frame relative to the supporting wheels of the implement, by power derived from said land wheel. Clutches of this type are well-known in the art and usually comprise a driving member, made fast to the hub of the land wheel in any suitable manner, and a driven member adapted to be thrown into clutching engagement with said driving member by a tripping lever so that said driven member will be turned a half revolution and then be automatically locked in such position, while at the same time the driving member is disengaged from the driven member. The driven member is provided with a crank pin 23a which has suitable connection with the frame of the implement through a thrust or lifting link 23 so that when the driven member is revolved through the lifting portion of its cycle an upward thrust will be transmitted through the lifting link 23 and at the same time the crank axle 18 and land wheel will be swung in a backward and downward direction relative to the frame, thereby raising the frame relative to the ground surface. As clutches of this type are well-known in the art it is believed that this brief description of the same will suffice.

The power lift clutch is provided with the usual tripping or operating lever 20 which has a pivot mounting on an arm 21 secured to and extending downwardly from the inner end of the upper horizontally turned portion of the crank axle 18, as shown in Fig. 5. Connected with the upper end of this lever 20 and extending forwardly to the operator's position on the drawing tractor is a rope or cable 22 for operating said lever. This lever is normally held in inoperative position, holding the driven clutch element locked in stationary position, by a compression spring 20a as shown in Fig. 2.

The main depth adjusting arm through which the depth of penetration of the discs is regulated is indicated at 24, which has its swinging end pivotally connected at 23b to the thrust link 23 and has its opposite end formed integral with one end of a rock shaft 25 journaled in a horizontal sleeve portion 26, such sleeve portion being formed integral with and extending upwardly from the forward end portion of the rear truck 15, as best shown in Fig. 5. The opposite end of said rock shaft—the landside end—has fixed thereto an upwardly extending arm 27 (see Figs. 2 and 5). Bolted to the arm 27, and bent so that its upper end is spaced from said arm in parallel relation thereto, is a bracket 28, best shown in Fig. 5, which affords a yoke or forked upper end on the arm 27.

Mounted between said bracket and arm is a member 29 provided with a pair of diametrically opposite trunnions 31 which are journaled in alined perforations provided in said bracket and arm so that the member 29 has pivotal mounting between these members to swing in a vertical plane, see Figs. 8 and 10. The member 29 is also provided with two relatively long integral sleeve portions or members 29a extending forwardly and rearwardly therefrom as shown. The member 29 is provided with a vertical bore 32 which rotatably receives a nut 33, and it is also provided with a longitudinal bore 34 extending therethrough and through said sleeve portions, which bore intersects said vertical bore. The forward threaded end of a depth adjusting crank screw 35 extends loosely through the longitudinal bore 34 and threads into a longitudinally extending threaded opening in the nut 33. As shown, the threads of the screw are completely enclosed within said sleeve portions 29a, which thus act as a dirt and dust shield for the screw. The bore in the members 29a is flared outwardly in the horizontal plane toward the outer ends of said members as shown in Figs. 8 and 10 so that the screw will have some lateral play therein. By reason of the pivotal mounting of the trunnions 31 of the member 29 in a horizontal plane said member is permitted to rock in a vertical plane, and as the nut 33 is so mounted in the member 29 that it may rotate therein about an axis at right angles to the trunnion axis said nut is given a universal movement, the result being, therefore, that there can be no binding action between the crank screw 35 and the nut 33 when the crank screw is turned to move the nut along the crank screw, notwithstanding any slight inaccuracy in the mounting of the trunnions 31 or the transverse position of the arm 27 on the rock shaft 25. The nut 33 is provided with a suitable lubricating nipple 36 so that the threads of the nut and of the crank screw may be properly lubricated.

The rear portion of the crank screw 35 is rotatably supported in the upper end of a standard 38, and is held against longitudinal movement relative thereto by a shoulder 39 formed integral with said crank screw in rear of said standard and a collar 41 riveted thereto in front of said standard. The crank screw 35 is provided with a handle portion 42, and by turning said crank screw in one direction or the other the depth of penetration of the discs in the ground may be easily regulated. As will be readily understood, with the parts in the position shown in Fig. 2, which illustrates the discs in operating position, if it is desired to position the discs to operate at a shallower depth than that shown, the crank screw 35 will be operated to swing the arm 27 to the left, which, through the rock shaft 25, will move the forward end of the arm 24 in a downward direction which forces the thrust link 23 of the clutch downwardly, but as the wheel is resting on the ground and cannot be forced downwardly the frame will be raised relative to the wheel, thus raising the discs carried by the frame to the desired extent. This depth adjusting motion is also transmitted to the front supporting wheel of the implement through mechanism which I shall presently describe.

Coming now to the mechanism by which the frame is raised relative to the three supporting wheels of the implement by means of the power lift clutch associated with the land wheel, a bracket 43 is mounted on the upper horizontally extending portion of the crank axle 18 (see Figs. 2 and 5), said bracket being fixedly secured to the downwardly extending portion of said axle by means of a bolt 44 which passes through a perforation in the up-set portion 18a thereof. The bolt 44 is held in position by a nut 45 threaded thereon.

The bracket 43 is provided with an upwardly extending arm 46 to which is bolted a rearwardly and downwardly extending plate or arm 47, the rear end of which is pivotally connected at 48' with a link 48 which in turn is pivotally connected with the lower end of a crank arm 49 of a rock shaft 51 journaled in upstanding lugs 52 and 53 formed integral with the rear end of the truck 15, as best shown in Figs. 2 and 3. A rear wheel supporting member in the form of a casting 54 is non-rotatably fixed on the shaft 51 between the lugs 52, 53, (see Fig. 4), by means of a key 55 cast integral with the member 54 and fitting within a keyway 56 formed in the shaft 51. The supporting member 54 has formed integral with it a downwardly and rearwardly extending member in the form of a sleeve 57 which provides a bearing for the upper spindle portion 58 of a crank axle 59, the lower turned end of which carries the inclined rear furrow wheel 61. The spindle 58 is held against withdrawal from the sleeve 57 by a cotter pin 62 or any other suitable means, as shown in Fig. 4. It will be seen that in the power actuated lifting operation, the downward and rearward swinging motion of the crank axle 18 will transmit a forward pull through the link 48 to the arm 49, thereby rocking the furrow wheel crank axle 39 in a downward and forward direction relatively to the frame, causing the frame to lift relatively to the rear furrow wheel along with the lift relatively to the land wheel. The degree of power lift relatively to the rear furrow wheel can be adjusted by placing the rear pivot end of the link 48 in different ones of the holes 49' in the arm 49.

For counterbalancing part of the weight of the implement I provide a helical spring 63, the rear end of which is secured to the truck 15 near its rear end by means of a link 64 adjustably connected to a lug 65 extending downwardly from said truck. The forward end of said spring is connected with a link 66 pivotally connected with one of a series of holes 67 provided in the depending portion 68 of the bracket 43. (See Fig. 2.)

The upwardly extending arm 46 of the bracket 43 is connected by means of a link 69 with one arm 71a of what may be termed a bell crank lever 71 which is pivoted to rock in a horizontal plane on the upper end of a pivot bolt 72. The lower portion of this bolt, as shown in Fig. 4, pivotally connects the rear truck 15 with the parallel members 11 and 12 of the frame through a member or casting adapted to be clamped to the parallel members 11 and 12 so that said truck may pivot about said bolt to change the angle of the discs or the width of cut of the implement, as has been described in my above mentioned copending application. In the present construction, the angular relation of the frame and truck is controlled by a link 70 having one end connected with said casting and the other end disposed in an opening in the lug 52, as best shown in Figures 3 and 4. Preferably, link 70 is threaded and carries lock nuts disposed on opposite sides of the lug 52 to provide for securing adjustment of the angularity between the truck and frame, in the manner set forth and claimed in the copending application of Carl G. Strandlund, Ser. No. 381,103, filed July 26, 1929. The bell crank lever 71 is suitably spaced from the members 11 and 12 by means of a spacing plate 73, and is journaled on a bushing 74 which embraces the upper end of the pivot bolt 72, as best shown in Fig. 4, said bushing being clamped on said bolt above the plate 73 by means of a nut 75. The opposite arm 71b of the bell crank lever 71 is pivotally connected with an actuating bar 76 which extends forwardly to a point adjacent the front furrow wheel, as will be hereinafter described. The arm 71b of said bell crank lever is reenforced by means of a plate 77 fixedly secured to said arm by means of bolts 78 and a spacing block 79, and the rear end of the motion transmitting bar 76 is pivoted between the plate 77 and the outer end of the arm 71b by means of a pivot pin 81, the inner end of the reenforcing plate 77 being journaled on the bushing 74, as will be seen in Fig. 4.

Adjustably secured to the forward end of the bar 76 by bolts 82 in an extension bar 83 which may be shifted to increase or decrease the effective length of the motion transmitting bar 82. such adjustment accommodating the removal or replacement of sections of the discs. The forward portion of the extension bar is curved downwardly and has its lower end pivotally connected at 84 to a crank arm 85 formed at one end of a rock shaft 86 suitably journaled in the upper ends of spaced supporting brackets or standards 87, which are secured by bolts or in any other suitable manner to the front truck 14 of the frame and extend upwardly therefrom, as shown in Figs. 6 and 7. Collars 88 are riveted or otherwise secured to said rock shaft adjacent the inner sides of said supporting standards to prevent longitudinal movement of said rock shaft relative to said standards. It will be noted that this rock shaft extends substantially at right angles to the line of the discs and the actuating bar 76.

The opposite end of said rock shaft 86 is provided with a laterally extending arm 89, which, near its outer end, is pivotally connected with an upwardly extending link or rod 91, the upper end portion of which is provided with screw threads, as shown. The upper end of this rod is connected, as will be shortly described more in detail, with an adjusting lever 92 (Fig. 7) pivotally mounted at 93 on an arm 94 which is formed integral with and extends laterally from a cap 95. Such cap is suitably connected with the upper end of a vertical spindle 96 which is journaled in the front truck 14 and has a laterally turned lower end 97 on which is rotatably mounted the front supporting wheel 98 of the implement. The cap 95 is connected with the upper end of the spindle in any suitable manner so that the cap is held thereon against vertical movement, but so that the spindle may turn in said cap.

A notched sector 99 is bolted to the arm 94 and the adjusting lever is provided with the usual detent 101 which cooperates with the sector to hold said lever in any desired adjusted position. The forward end of the lever 92 is forked as shown in Fig. 6, and a sleeve 102 is pivotally mounted between the arms of the fork by a pivot pin 103. As shown in Figs. 6 and 7, the screw-threaded end of the upwardly extending link 91 above described extends through this sleeve 102, and the bore of said sleeve is made large enough so that the sleeve may slide freely along said link. Threaded on the link 91 below the sleeve 102 is an adjusting nut 104 by which the position of said sleeve on said link may be adjusted vertically as desired. An internally threaded sleeve 105 provided with an operating handle 106 is also screwed on to the link 91 above the sleeve 102 to adjust the position of the sleeve or to prevent movement of said sleeve upwardly along said link when the lever 92 is adjusted. The sleeve 105 and operating handle 106 provide an auxiliary crank screw adjusting means in addition to the lever 92 for additional range of movement of the front furrow wheel not possible to obtain with the lever adjusting devices alone.

From the foregoing it will be seen that although the front furrow wheel of the implement is positioned a considerable distance both laterally and forwardly from the land wheel from which the power for raising the frame relative to the front furrow wheel is derived, power lift motion is effectively transmitted from the land wheel to the front furrow wheel through the horizontally swinging bell crank lever which transmits the lifting motion through the pronounced lateral angle between such wheels. The front rock shaft 88, in extending substantially at right angles to the line of discs and to the actuating bar 76, effectively transmits the motion of such bar to the front wheel for raising the front end of the frame.

An additional counterbalance spring 107 (Fig. 1) is connected at one end with the crank arm 85 and at its other end with a bracket 108 suitably secured to the frame bar 12, as shown. This spring acts to counterbalance the front end of the frame in the same manner that the spring 63 counterbalances the rear end of the frame as before described.

The operation of my improved lifting mechanism is as follows: In Fig. 2 the various parts are indicated in the positions they occupy when the discs are in operating or lowered position, and I shall describe the operation of the parts in moving the discs to inoperative or transport position. To accomplish this operation the operator pulls forward on the lever 20, against the action of the spring 20a, throwing the driven member of the clutch 19 into operative engagement with the driving member thereof so that the driven member will be driven with the land wheel. As the driven member rotates the pivot connection 23a of the thrust link 23 will be moved rearwardly and upwardly until the clutch has made a half revolution, at which time the driven member will be automatically locked in such position and the driving member will be released from clutching engagement therewith, as is usual in clutches of this type. As the arm 24 is held against movement by the crank screw 35 the frame will be raised by the backward movement of the land wheel and crank axle 18, the frame turning on the pivot axis formed by the upper horizontally turned end of said crank axle and the lower horizontally turned end of said crank axle rotating in its bearing in the hub of the land wheel.

The bolt 44 connecting the crank axle with the bracket 43 will force the lower arm 68 of said bracket rearwardly, swinging the bracket on its pivot mounting on the crank axle and moving the upper arm 46 thereof forwardly. In this movement the upper arm 46, through the plate 47 and link 48, swings the crank arm 49 forwardly, turning the rock shaft 51 in a clockwise direction in its bearing, which, through its connection with the rear furrow wheel mounting swings said wheel forwardly, raising the rear portion of the rear truck relative to the ground surface. Simultaneously with the raising of the rear portion of the frame relative to the ground surface the forward portion of the frame is raised by the following mechanism: The link 69 connected with the upper arm 46 of the bracket 43 is moved forwardly, swinging the bell-crank 71 in a clockwise direction (Fig. 1) on its pivot mounting on the bolt 72, which moves the fore and aft extending bars 76 and 83 rearwardly, and through the crank arm 85 turning the rock-shaft 86 in a counterclockwise direction (Fig. 6). This movement of the rock shaft through its laterally extending arm 89 will pull downwardly on the link 91 and exert a downwardly acting force on the cap 95 through the lever 92. As the connection between the cap and lever is a rigid one, the lever being locked to the sector, and since the cap cannot move downwardly relative to the spindle 96, the frame will be forced upwardly on said spindle through an upwardly acting force effective on the brackets 87, as will be readily understood. It will therefore be seen that the entire frame of the implement will be raised simultaneously relative to the ground surface, thereby raising the discs carried by the frame.

When it is desired to again lower the discs to operating position, the operator pulls on the lever 20, again throwing the clutch members into operative engagement with each other, whereby the driven member is again turned a half revolution, bringing the pivot point 23a into its lowermost position, when the driven member of the clutch is again automatically locked in such position, and during this movement the frame will drop by gravity, all as will be readily understood.

The hand operated lever operatively connected with the front furrow wheel spindle is provided for regulating the depth of penetration of the discs at the forward end of the machine in the same manner that the screw crank 35 regulates the depth of penetration of the discs at the rear end of the machine. Also, these two depth adjusting devices may be used for levelling purposes, as is well understood in the art. Any considerable depth adjustment made through the crank screw 35 is also transmitted through the bell crank lever 71 to the front wheel for correspondingly adjusting the front end of the implement. When the implement is in tilling position the front pivot 48' of the link 48 is preferably in approximately dead center relation to the rotative axis of the bracket 43 and to the pivot point 49' at the other end of the link 48 so that no material portion of the ordinary depth adjusting movement is transmitted to the rear furrow wheel.

I claim:

1. In an implement, the combination with a frame, a front supporting wheel for said frame, a crank axle pivotally mounted at one end on said frame, a land wheel on the swinging end of said crank axle, and means for raising said frame relative to said land wheel, of a lever mounted on said frame and swinging in a substantially horizontal plane, and means operatively connecting said lever with said crank axle and with said front supporting wheel for raising said frame relative to said latter wheel.

2. In an implement, the combination with a frame, a front supporting wheel for said frame, a furrow wheel at the rear of said frame, a crank axle pivotally mounted at its upper end on said frame, a land wheel on the lower end of said crank axle, and means for raising said frame relative to said land wheel, of a lever mounted on said frame and swinging in a substantially horizontal plane, means operatively connecting said lever with said crank axle and with said front supporting wheel for raising said frame relative to said front supporting wheel, and means operatively connecting said crank axle with said furrow wheel for raising said frame relative to said furrow wheel.

3. In an implement, the combination with a frame, a front supporting wheel for said frame, a furrow wheel at the rear of said frame, a crank axle pivotally mounted at its upper end in said frame, a land wheel on the lower end of said crank axle, and means for raising said frame relative to said land wheel, of a lever mounted on said frame and swinging in a substantially horizontal plane, means operatively connecting said lever with said crank axle and with said front supporting wheel for raising said frame relative to said front supporting wheel simultaneously with the raising of said frame relative to said land wheel, and means operatively connecting said crank axle with said furrow wheel for raising said frame relative to said furrow wheel simultaneously with the raising of said frame relative to the other of said wheels.

4. In an implement, the combination with a frame, a front supporting wheel for said frame, a furrow wheel at the rear of said frame, a crank axle pivotally mounted at its upper end in said frame, a land wheel on the lower end of said crank axle, and means for raising said frame relative to said land wheel, of a link operatively connected with said crank axle for transmitting forward motion, a bar operatively connected at its forward end with said front supporting wheel for raising said frame relative to said wheel upon rearward movement of said bar, and a reverse motion lever pivotally mounted on said frame and operatively connected with said link and with said bar for transmitting rearward motion to said bar upon forward movement of said link.

5. In an implement, the combination with a frame, a front supporting wheel for said frame, a crank axle pivotally mounted at its upper end on said frame, a land wheel on the lower end of said crank axle, and means for raising said frame relative to said land wheel, of a vertically extending plate mounted on said crank axle to move therewith, and power transmitting means acting in a substantially horizontal plane operatively connecting said plate with said front supporting wheel for raising said frame relative to said latter wheel.

6. In an implement, the combination with a frame, a front supporting wheel for said frame, a crank axle pivotally mounted at its upper end on said frame, a land wheel on the lower end of said crank axle, and means for raising said frame relative to said land wheel, of a vertically extending plate mounted on said crank axle to move therewith, and power transmitting means comprising a bell-crank lever acting in a substantially horizontal plane operatively connecting said plate with said front supporting wheel for raising said frame relative to said latter wheel.

7. In an implement, the combination with a frame, a front supporting wheel for said frame, a crank axle pivotally mounted at its upper end on said frame, a land wheel on the lower end of said crank axle, and means for raising said frame relative to said land wheel, of a vertically extending plate mounted on said crank axle to move therewith, a rock shaft mounted on the forward portion of said frame and operative to raise said frame relative to said front supporting wheel, and power transmitting means acting in a substantially horizontal plane connecting said plate with said rock shaft whereby said frame will be raised relative to said front supporting wheel concurrently with the raising of said frame relative to said land wheel.

8. In an implement, the combination with a frame, a front supporting wheel for said frame, a furrow wheel at the rear of said frame, a crank axle pivotally mounted at its upper end in said frame, a land wheel on the lower end of said crank axle, and means for raising said frame relative to said land wheel, of means connecting said crank axle with said front supporting wheel for raising said frame relative to said wheel, said means comprising power transmitting means acting in a horizontal plane, and means connecting said first-mentioned means with said furrow wheel for raising said frame relative to said wheel.

9. In an implement, the combination with a frame, a front supporting wheel for said frame, a crank axle pivotally mounted in said frame, a land wheel on the swinging end of said crank axle, and means for raising said frame relative to said land wheel, of a vertically extending plate mounted on said crank axle to move therewith, power transmitting means comprising a lever acting in a substantially horizontal plane operatively connecting said plate with said front supporting wheel for raising said frame relative to said front supporting wheel, a rock shaft pivotally mounted in said frame, a sleeve carried by said rock shaft to turn therewith, a wheel spindle journaled in said sleeve, a furrow wheel carried by said spindle, and a rearwardly extending arm carried by said plate and operatively connected with said rock shaft for swinging said rock shaft to raise said frame relative to said furrow wheel.

10. In an implement, the combination with a frame, a front supporting wheel for said frame, a furrow wheel for the rear portion of said frame, a crank axle pivotally mounted at its upper end on said frame, a land wheel on the lower end of said crank axle, and means for raising said frame relative to said land wheel, of a rock shaft mounted on the forward portion of said frame, a crank arm on said rock shaft and operatively connected with said front supporting wheel whereby rearward movement of said arm raises the frame relative to said wheel, a vertically extending plate mounted on said crank axle to move forwardly upon the raising of said frame relative to said land wheel, a reverse motion lever pivotally mounted on said frame to swing in a substantially horizontal plane, means connecting one end of said lever with said crank arm, means connecting the opposite end of said lever with said plate, said lever translating forward movement of said plate into rearward movement to said arm to raise said frame relative to said front supporting wheel.

11. In an implement, the combination with a frame, a front supporting wheel for said frame, a furrow wheel for the rear portion of said frame, a crank axle pivotally mounted at its upper end on said frame, a land wheel on the lower end of said crank axle, and means for raising said frame relative to said land wheel, of a rock shaft mounted on the forward portion of said frame, a crank arm on said rock shaft and operatively connected with said front supporting wheel whereby rearward movement of said arm raises the frame relative to said wheel, a vertically extending plate mounted on said crank axle to move forwardly upon the raising of said frame relative to said land wheel, a reverse motion lever pivotally mounted on said frame to swing in a substantially horizontal plane, means connecting one end of said lever with said crank arm, means connecting the opposite end of said lever with said plate, said lever translating forward movement of said plate into rearward movement to said arm to raise said frame relative to said front supporting wheel, a rear furrow wheel mounted on said frame, and means connecting said vertically extending plate with said rear furrow wheel for raising said frame relative to said rear furrow wheel.

12. In an implement, the combination with a frame, a front supporting wheel for said frame, a crank axle pivotally mounted at its upper end on said frame, a land wheel on the lower end of said crank axle, and power operated means for raising said frame relative to said land wheel, of a lever mounted on said frame and swinging in a substantially horizontal plane, means operatively connecting said lever with said crank axle and with said front supporting wheel for raising said frame relative to said latter wheel, and manually operated adjusting means mounted at the front portion of the frame for adjusting the forward portion of the frame vertically relative to said front supporting wheel independently of the operation of said lever.

13. In an implement, the combination with a frame, a front supporting wheel for said frame, a furrow wheel at the rear of said frame, a crank axle pivotally mounted at its upper end on said frame, a land wheel on the lower end of said crank axle, and power operated means for raising said frame relative to said land wheel, of a lever mounted on said frame and swinging in a substantially horizontal plane, means operatively connecting said lever with said crank axle and with said front supporting wheel for riasing said frame relative to said latter wheel, means connecting said last-named means with said furrow wheel for raising said frame relative to said furrow wheel, and a crank screw mounted on the rear portion of said frame for adjusting the frame vertically relative to said land wheel and said front supporting wheel independently of the operation of said power operated means.

14. In an implement, the combination with a frame, a front supporting wheel for said frame, a furrow wheel at the rear of said frame, a crank axle pivotally mounted at its upper end on said frame, a land wheel on the lower end of said crank axle, and power operated means for raising said frame relative to said land wheel, of a lever mounted on said frame and swinging in a substantially horizontal plane, means operatively connecting said lever with said crank axle and with said front supporting wheel for raising said frame relative to said latter wheel, a lever mounted at the front portion of the frame for adjusting the forward portion of the frame vertically relative to said front supporting wheel independently of the operation of said lever, means connecting said last-named means with said furrow wheel for raising said frame relative to said furrow wheel, and a horizontally extending crank screw mounted on the rear portion of said frame for adjusting the frame vertically relative to said land wheel and said front supporting wheel independently of the operation of said power operated means.

15. In a disc tiller, the combination of a frame, a plurality of wheels comprising a front supporting wheel and a land wheel adjustably supporting said frame, a plurality of rotatable discs mounted on said frame with all of the discs facing in the same direction and substantially alined on a common axis which is inclined to the line of draft of said frame, and power lift mechanism comprising a lever swinging in a substantially horizontal plane and operatively connecting said wheels for transmitting power lift energy from one to the other.

16. In an implement, the combination with a wheel supported frame, and power operated means for raising said frame relative to its wheels, of means for adjusting said frame vertically relative to said wheels independently of said power operated means, said last-named means comprising a crank screw mounted on said frame, an arm, means affording a universal joint connection between said screw and said arm, and means connecting said arm with said power operated means.

17. In an implement, the combination with a wheel supported frame, and power operated means for raising said frame relative to its wheels, of means for adjusting said frame vertically relative to said wheels independently of said power operated means, said last named means comprising a crank screw mounted on said frame, an arm operatively connected with said power operated means, and means connecting said screw and arm and movable about a plurality of axes at angles to each other.

18. In an implement, the combination with a wheel supported frame, and power operated means for raising said frame relative to its wheels, of means for adjusting said frame vertically relative to said wheels independently of said power operated means, said last-named means comprising an arm operatively connected with said power operated means, a rock shaft journaled on said frame and connected with said arm, a forked arm on said rock shaft, a bearing sleeve pivotally mounted in said forked arm to rock in a substantially vertical plane, a nut mounted in said sleeve to rotate in a longitudinal plane, and a crank screw loosely mounted in said sleeve and operatively engaging said nut, said nut providing a universal joint connection between said screw and said arm.

19. In an implement, the combination with a wheel supported frame, of means for adjusting said frame vertically relative to said wheels, said means comprising a rock shaft, a lever on said rock shaft, a crank screw rotatably mounted on said frame, and means operatively connecting said crank screw with said lever, said means comprising a sleeve pivotally mounted on said lever to rock in a vertical plane, and a nut threaded on said crank screw and mounted in said sleeve to rotate in a longitudinal plane.

20. In an implement, the combination with a wheel supported frame, of means for adjusting said frame vertically relative to said wheels, said means comprising a rock shaft, a lever on said rock shaft, a crank screw rotatably mounted on said frame, and means operatively connecting said crank screw with said lever, said means comprising a sleeve pivotally mounted on said lever to rock in one plane, a nut threaded on said crank screw and mounted in said sleeve to rotate in another plane, and means associated with said sleeve forming a shield for said crank screw.

21. In an implement, the combination with a wheel supported frame, of a truck connected with the rear end portion of said frame, oppositely related crank axles mounted on said truck and movable toward and away from each other, wheels on said crank axles, means operated by power derived from one of said wheels for moving said crank axles toward each other for raising said frame relative to said wheels, and manually operated means mounted on the truck for adjusting said frame vertically relatively to said wheels.

22. In an implement, the combination with a diagonal frame having a supporting wheel at its forward end, of a truck adjustably connected with the rear end portion of said frame and provided with supporting wheels, crank axles connecting said wheels with said truck, means connecting said crank axles whereby one of said axles is swung in one direction and the other is swung in the opposite direction in raising said frame through power derived from one of said wheels, and manually operated means mounted on the truck and operative through said connecting means for adjusting the frame vertically relatively to said wheels.

23. An agricultural implement comprising a frame, said frame including two spaced side members extending at an angle to the line of draft of the implement, a plurality of disc sections carried by said frame, a truck for supporting one end of the frame, said truck being clamped to said side members of said frame and angularly adjustable with respect thereto, crank axles pivotally mounted at their upper ends on said truck, supporting wheels on the lower ends of said crank axles, power operated means deriving power from one of said wheels, and means connecting said power operated means with said crank axles for swinging said crank axles to raise said frame relative to said supporting wheels.

24. An agricultural implement comprising a frame, said frame including two spaced side members extending at an angle to the line of draft of the implement, a plurality of disc sections carried by said frame, a truck for supporting one end of the frame, a connecting member secured to the truck and including flanges clamped between the side members of the frame, crank axles pivotally mounted at their upper ends on said truck, supporting wheels on the lower ends of said crank axles, power operated means for swinging one of said crank axles, and means connecting said crank axles together for raising said frame relative to said supporting wheels.

25. An agricultural implement comprising a frame, said frame including two spaced side members extending at an angle to the line of draft of the implement, a plurality of disc sections carried by said frame, a truck for supporting one end of the frame, said truck being clamped to said side members of said frame and angularly adjustable with respect thereto, supporting wheels for said truck, and power lift mechanism on said truck and associated with one of said supporting wheels for raising said frame relative to said wheels.

26. An implement of the class described comprising the combination of a frame, a plurality of tiller sections carried thereby, and wheel means for supporting the frame comprising a front wheel and a rear wheeled truck, a member adapted to be secured to the frame in any one of a plurality of adjusted positions, means securing said truck to said member, said means being operable to permit angular adjustment of the truck relative to the frame, and power lift means associated with one of the supporting wheels of said truck for raising said frame relative to the truck supporting wheels.

27. An implement of the class described comprising the combination of a frame, a plurality of tiller sections carried thereby, and wheel means for supporting the frame comprising a front wheel and a rear wheeled truck, a member adapted to be secured to the frame in any one of a plurality of adjusted positions, means securing the truck to said member, said means being operable to permit angular adjustment of the truck relative to the frame, and power lift means associated with one of the supporting wheels of said truck for adjusting the position of the respective wheels on the frame and on the truck.

28. An implement of the class described comprising the combination of a frame, a front supporting wheel for said frame, a wheeled truck supporting the rear end of said frame, a pivot bolt connecting said truck with said frame and about which bolt said truck has angular adjustment relative to said frame, said wheeled truck including a crank axle pivotally mounted at its upper end on said truck and a land wheel on the lower end of said crank axle, means for raising said frame relative to said land wheel, a vertically extending plate mounted on said crank axle to move therewith, and power transmitting means comprising a bell-crank lever supported on said pivot bolt operatively connecting said plate with said front supporting wheel for raising said frame relative to said latter wheel.

29. An implement of the class described comprising the combination of a frame, a front supporting wheel for said frame, a truck supporting the rear end of said frame, a pivot bolt connecting said truck with said frame and about which bolt said truck has angular adjustment relative to said frame, a crank axle pivotally mounted at its upper end on the forward portion of said truck, a land wheel on the lower end of said crank axle, means for raising said frame relative to said land wheel, and power transmitting means connecting said crank axle with said front supporting wheel comprising a bell crank lever supported on said pivot bolt for raising said frame relative to said front supporting wheel.

30. An implement of the class described comprising the combination of a frame, a front supporting wheel for said frame, a wheeled truck supporting the rear end of said frame, a vertical pivot bolt connecting said truck with said frame and about which bolt said truck has angular adjustment relative to said frame, said wheeled truck including a crank axle pivotally mounted at its upper end on the forward portion of said truck, a land wheel on the lower end of said crank axle and a furrow wheel at the rear of said truck, means for raising said frame relative to said land wheel, power transmitting means connecting said crank axle with said front supporting wheel comprising a bell-crank lever supported on said pivot bolt and acting in a substantially horizontal plane for raising said frame relative to said front supporting wheel, and means connecting said power transmitting means with said furrow wheel for raising said frame relative to said latter wheel.

In witness whereof I hereunto subscribe my name this 8th day of April, 1930.

WALTER H. SILVER.